(12) United States Patent
Noveck et al.

(10) Patent No.: US 8,161,236 B1
(45) Date of Patent: Apr. 17, 2012

(54) PERSISTENT REPLY CACHE INTEGRATED WITH FILE SYSTEM

(75) Inventors: David B. Noveck, Lexington, MA (US); Benjamin T. H. Cox, Gibsonia, PA (US); Peter F. Corbett, Lexington, MA (US); John R. Boyles, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 982 days.

(21) Appl. No.: 12/148,930

(22) Filed: Apr. 23, 2008

(51) Int. Cl.
*G06F 12/00* (2006.01)

(52) U.S. Cl. ....................................................... 711/113

(58) Field of Classification Search ................... 711/113
See application file for complete search history.

(56) References Cited

U.S. PATENT DOCUMENTS

| | | |
|---|---|---|
| 3,771,137 A | 11/1973 | Barner et al. |
| 4,075,686 A | 2/1978 | Calle et al. |
| 4,156,907 A | 5/1979 | Rawlings et al. |
| 4,268,907 A | 5/1981 | Porter et al. |
| 4,399,503 A | 8/1983 | Hawley |
| 4,476,526 A | 10/1984 | Dodd |
| 4,500,954 A | 2/1985 | Duke et al. |
| 4,504,902 A | 3/1985 | Gallaher et al. |
| 4,598,357 A | 7/1986 | Swenson et al. |
| 4,669,043 A | 5/1987 | Kaplinsky |
| 4,688,221 A | 8/1987 | Nakamura et al. |
| 4,698,808 A | 10/1987 | Ishii |
| 4,723,223 A | 2/1988 | Hanada |
| 4,761,785 A | 8/1988 | Clark et al. |
| 4,779,189 A | 10/1988 | Legvold et al. |
| 4,800,489 A | 1/1989 | Moyer et al. |
| 4,805,090 A | 2/1989 | Coogan |
| 4,831,520 A | 5/1989 | Rubinfeld et al. |
| 4,837,675 A | 6/1989 | Bean et al. |
| 4,864,497 A | 9/1989 | Lowry et al. |
| 4,868,734 A | 9/1989 | Idleman et al. |
| 4,888,691 A | 12/1989 | George et al. |
| 4,896,259 A | 1/1990 | Jacobs et al. |
| 4,899,342 A | 2/1990 | Potter et al. |
| 4,905,141 A | 2/1990 | Brenza |
| 4,972,316 A | 11/1990 | Dixon et al. |
| 4,989,206 A | 1/1991 | Dunphy, Jr. et al. |
| 5,016,165 A | 5/1991 | Tanikawa et al. |
| 5,119,485 A | 6/1992 | Ledbetter, Jr. et al. |
| 5,124,987 A | 6/1992 | Milligan et al. |
| RE34,100 E | 10/1992 | Hartness |

(Continued)

OTHER PUBLICATIONS

U.S. Appl. No. 12/105,914, filed Apr. 18, 2008, titled Flow Based Reply Cache, by Jason L. Goldschmidt et al., 31 pages.

(Continued)

*Primary Examiner* — Duc Doan
(74) *Attorney, Agent, or Firm* — Cesari and McKenna, LLP

(57) ABSTRACT

A system and method integrates a persistent reply cache with operation of a file system executing on a storage system. In an illustrative embodiment, the persistent reply cache is embodied as a file comprising a combination of contents of (i) one or more enhanced non-volatile log records of non-volatile electronic storage, (ii) "dirty" in-core buffer cache data structures, and (iii) on-disk data structures corresponding to those dirty buffer cache data structures. Integration is achieved through atomic operation of the reply cache with the file system to store information associated with a reply, e.g., to a client request, on electronic storage implemented as in-core buffer cache memory of the storage system, as well as on magnetic storage implemented as disks of the system.

20 Claims, 10 Drawing Sheets

U.S. PATENT DOCUMENTS

| | | | |
|---|---|---|---|
| 5,155,835 | A | 10/1992 | Belsan |
| 5,175,825 | A | 12/1992 | Starr |
| 5,179,702 | A | 1/1993 | Spix et al. |
| 5,185,694 | A | 2/1993 | Edenfield et al. |
| 5,206,939 | A | 4/1993 | Yanai et al. |
| 5,276,823 | A | 1/1994 | Cutts, Jr. et al. |
| 5,283,884 | A | 2/1994 | Menon et al. |
| 5,297,258 | A | 3/1994 | Hale et al. |
| 5,313,612 | A | 5/1994 | Satoh et al. |
| 5,333,294 | A | 7/1994 | Schnell |
| 5,355,453 | A | 10/1994 | Row et al. |
| 5,388,242 | A | 2/1995 | Jewett |
| 5,388,243 | A | 2/1995 | Glider et al. |
| 5,426,747 | A | 6/1995 | Weinreb et al. |
| 5,524,205 | A | 6/1996 | Lomet et al. |
| 5,581,724 | A | 12/1996 | Belsan et al. |
| 5,778,431 | A | 7/1998 | Rahman et al. |
| 5,907,848 | A | 5/1999 | Zaiken et al. |
| 6,014,674 | A | 1/2000 | McCargar |
| 6,078,999 | A | 6/2000 | Raju et al. |
| 6,266,785 | B1 | 7/2001 | McDowell |
| 6,442,508 | B1 | 8/2002 | Liao et al. |
| 6,636,879 | B1 | 10/2003 | Doucette et al. |
| 6,671,773 | B2 | 12/2003 | Kazar et al. |
| 6,721,764 | B2 * | 4/2004 | Hitz et al. ............................. 1/1 |
| 6,732,293 | B1 | 5/2004 | Schneider |
| 6,856,993 | B1 | 2/2005 | Verna et al. |
| 6,910,154 | B1 * | 6/2005 | Schoenthal ..................... 714/18 |
| 7,062,675 | B1 | 6/2006 | Kemeny et al. |
| 7,093,072 | B2 | 8/2006 | Haskins |
| 7,234,076 | B2 | 6/2007 | Daynes et al. |
| 2003/0088814 | A1 | 5/2003 | Campbell et al. |

OTHER PUBLICATIONS

Shepler, S., et al., "NFS Version 4 Minor Version 1 (draft-ietf-nfsv4-minorversion1-21.txt)", Internet-Draft, http://www.nfsv4-editor.org/draft-21/draft-ietf-nfsv4-minorversion1-21-1n.txt, The IETF Trust, Feb. 25, 2008, 536 pages.

Tanenbaum, Andrew S., "The Internet Transport Protocols (TCP and UDP)", Section 6.4: The Transport Layer, Computer Networks Third Edition, Mar. 1996, Prentice-Hall, Inc., Upper Saddle River, New Jersey, pp. 521-542.

Juszczak, Chet, "Improving the Performance and Correctness of an NFS Server", Winter 1989 USENIX Conference Proceedings, USENIX Association, Feb. 1989, Berkeley, CA, 11 pages.

Gait, Jason, Phoenix: A Safe In-Memory File System. Communications of the ACM, 33(1): pp. 81-86, Jan. 1990.

Kazar, Michael L., et al., Decorum File System Architectural Overview, USENIX Summer Conference, Anaheim, California, 1990, 13 pages.

Lorie, Raymond, A, Physical Integrity in a large segmented database, ACM Trans. Database Systems, 2(1): 91-104, Mar. 1977.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on the Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Rosenblum, Mendel, et al. The Design and Implementation of a Log-Structured File System Jul. 24, 1991 pp. 1-15.

Sandberg, Russel et al., Design and implementation of the Sun Network Filesystem. In Proc. Summer 1985 USENIX Conf., pp. 119-130, Portland OR (USA), Jun. 1985.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Sidebotham, Bob, Volumes: The Andrew File System Data Structuring Primitive, EEUG Conference Proceedings, Manchester, UK, Autumn 1986.

* cited by examiner

PERSISTENT REPLY CACHE INTEGRATED WITH FILE SYSTEM

FIELD OF THE INVENTION

The present invention relates to storage systems and, more specifically, to a persistent reply cache used in a storage system.

BACKGROUND OF THE INVENTION

A storage system is a computer that provides storage services relating to the organization of information on writeable persistent storage devices, such as non-volatile memories and/or disks. The storage system typically includes a storage operating system that implements a file system to logically organize the information as a hierarchical structure of data containers, such as files and directories on, e.g., the disks. Each "on-disk" file may be implemented as set of data structures, e.g., disk blocks, configured to store information, such as the actual data for the file. A directory, on the other hand, may be realized as a specially formatted file in which information about other files and directories are stored.

The storage system may be further configured to operate according to a client/server model of information delivery to thereby allow many clients to access files and directories stored on the system. In this model, the client may comprise an application executing on a computer that "connects" to the storage system over a computer network, such as a point-to-point link, shared local area network, wide area network or virtual private network implemented over a public network, such as the Internet. Each client may request the services of the storage system by issuing file system protocol messages or requests, such as the conventional Network File System (NFS) protocol requests, to the system over the network identifying one or more files to be accessed. In response, a file system executing on the storage system services the request and returns a reply to the client.

Many versions of the NFS protocol require reply caches for their operation. A reply cache may serve many purposes, one of which is to prevent re-execution (replay) of non-idempotent operations by identifying duplicate requests. By caching reply information for such operations, replies to duplicate requests may be rendered from cached information, as opposed to re-executing the operation with the file system. For example, assume a client issues an NFS request to the storage system, wherein the request contains a non-idempotent operation, such as a rename operation that renames, e.g., file A to file B. Assume further that the file system receives and processes the request, but the reply to the request is lost or the connection to the client is broken. A reply is thus not returned to the client and, as a result, the client resends the request. The file system then attempts to process the rename request again but, since file A has already been renamed to file B, the system returns a failure, e.g., an error reply, to the client (even though the operation renaming file A to file B had been successfully completed). A reply cache attempts to prevent such failures by recording the fact that the particular request was successfully executed, so that if it were to be reissued for any reason, the same reply will be resent to the client (instead of re-executing the previously executed request, which could result in an inappropriate error reply).

Typically, the reply cache has been implemented in volatile memory of a storage system. This poses the issue that if retransmission of the request (e.g., an NFS request) occurs as a result of non-responsiveness while the storage system reboots, a failure similar to that described above can occur. For example, suppose that the storage system processes the request to rename file A to file B and, after processing the request, the storage system powers-down and performs a reboot operation. Since the rename operation had been effected in the file system image before the reboot operation, re-execution of the request results in a spurious error; if the reply cache is volatile, there is no way to prevent this error. In other words, when the storage system powers down and reboots, the contents of the reply cache are lost.

A solution to the above-described problem is to implement the reply cache in persistent storage. However, previous attempts to implement such a reply cache encountered a number of difficulties. For instance, persistent storage of reply cache information on, e.g., disk typically imposes too great a performance penalty for general use. That is, the input/output (I/O) latency associated with accessing disk for reply cache information imposes a substantial performance penalty. On the other hand, storage in non-volatile memory, such as random access memory, is often expensive because of the storage space requirements. Here, the amount of non-volatile memory needed to accommodate a typical size for the reply cache is substantial and, thus, often prohibitively expensive.

SUMMARY OF THE INVENTION

The present invention overcomes the disadvantages of the prior art by providing a system and method for integrating a persistent reply cache with operation of a file system executing on a storage system. In an illustrative embodiment, the persistent reply cache is embodied as a file comprising a combination of contents of (i) one or more enhanced non-volatile log records of non-volatile electronic storage, (ii) "dirty" in-core buffer cache data structures, and (iii) on-disk data structures corresponding to those dirty buffer cache data structures. Integration is achieved through atomic operation of the reply cache with the file system to store information associated with a reply, e.g., to a client request, on electronic storage implemented as in-core buffer cache memory of the storage system, as well as on magnetic storage implemented as disks of the system. To that end, the invention takes advantage of a consistency model of the file system to ensure that contents of the dirty in-core buffer cache data structures of the reply cache are consistent with corn responding on-disk data structures of that cache. Advantageously, the invention ensures that operation of the persistent reply cache is atomic with respect to file system operations in a simple, effective and reliable way.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention is directed to a system and method for integrating a persistent reply cache with the operation of a file system of a storage operating system executing on a storage system. As used herein, the term "storage operating system" generally refers to the computer-executable code operable on a computer to perform a storage function that manages data access and may, in the case of a storage system, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In an illustrative embodiment described herein, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to the file system component of any storage operating system that is otherwise adaptable to the teachings of this invention.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present invention may be utilized with any suitable file system, including a write anywhere file system.

System Environment

Figure 1:
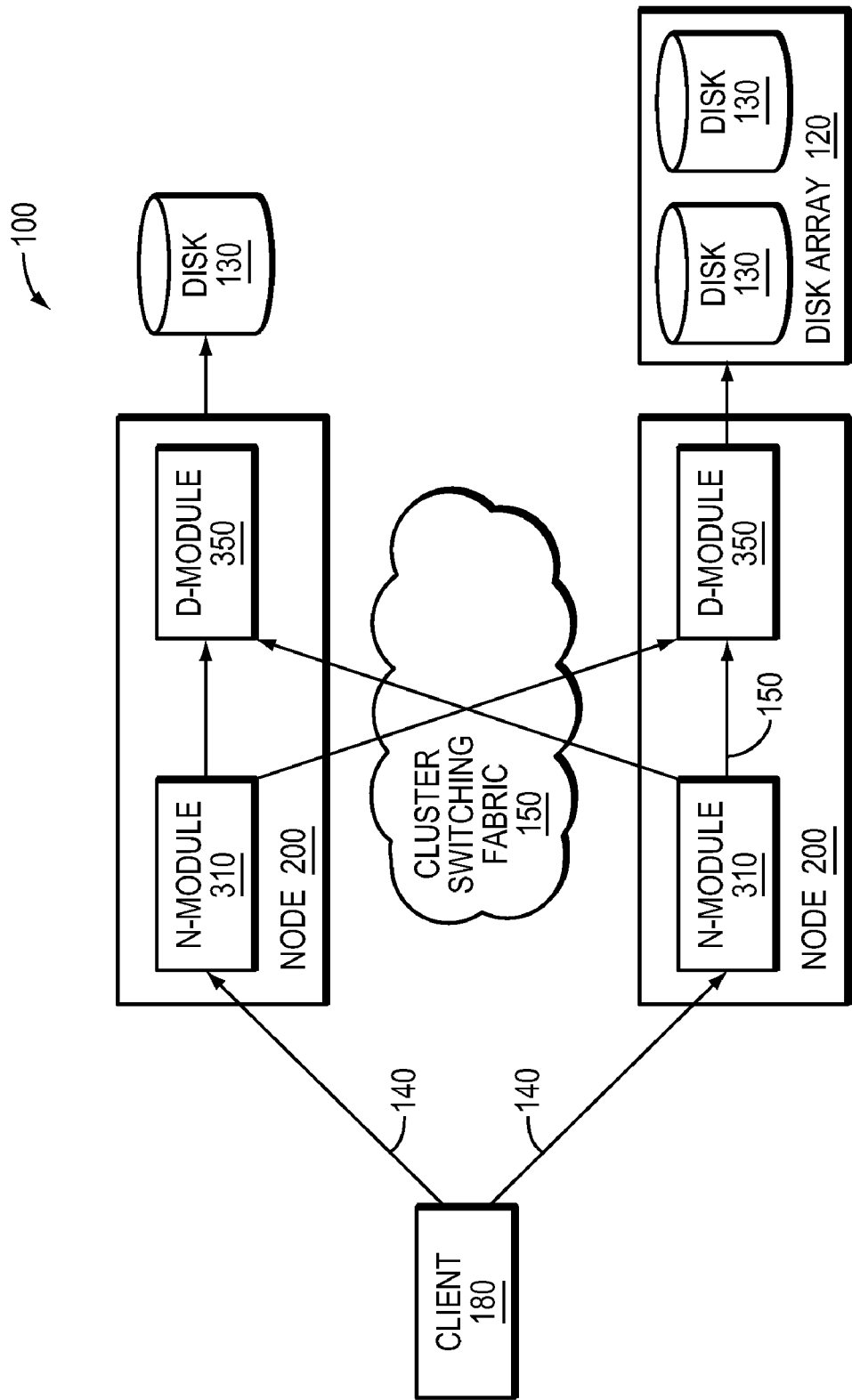
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350), although the description of a node 200 comprising one N-module and one D-module should be taken as illustrative only. The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Network File System (NFS) protocol, over the Transmission Control Protocol/Internet Protocol (TCP/IP) when accessing information in the form of data containers, such as files and directories.

Figure 2:
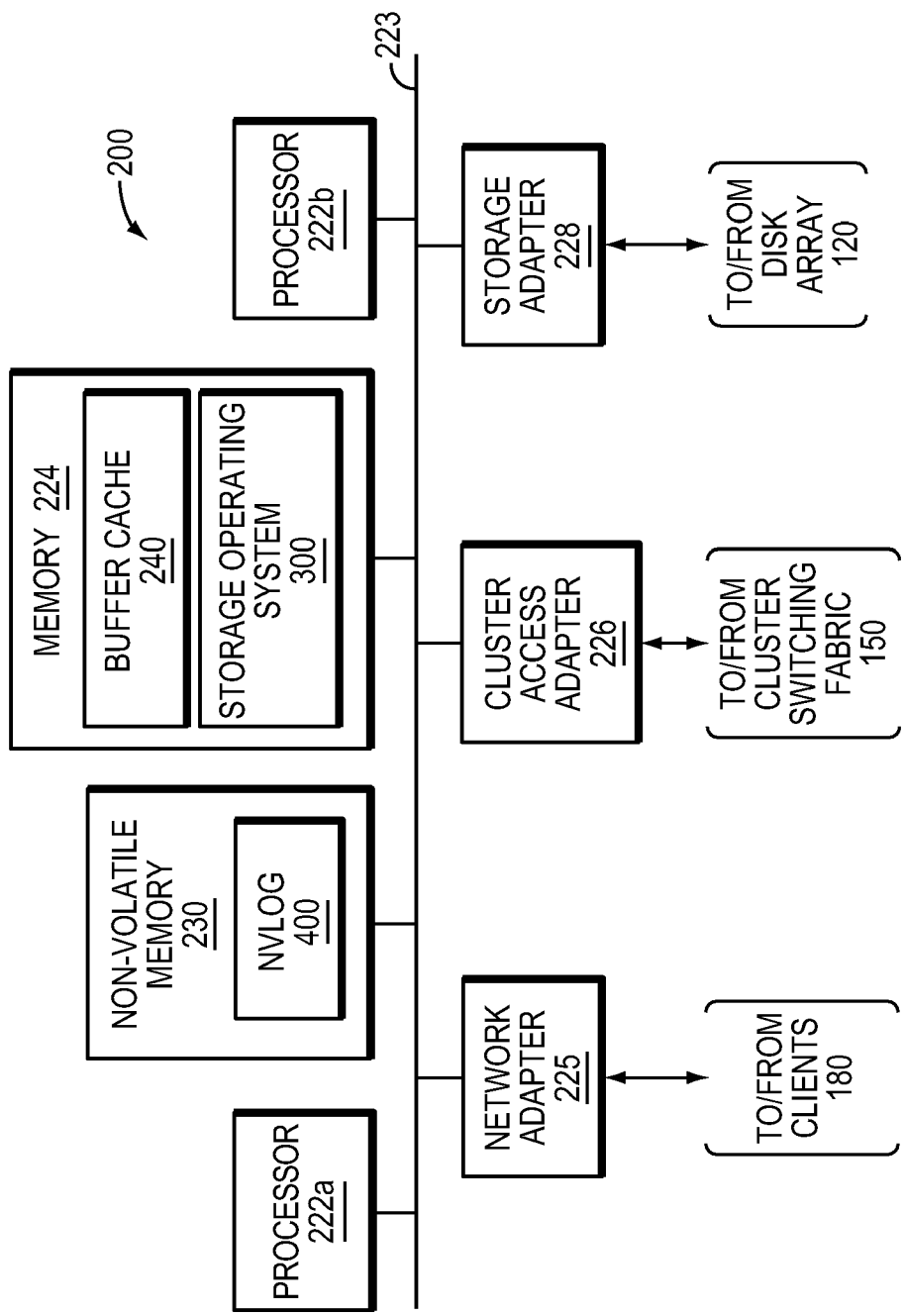
FIG. 2 is a schematic block diagram of a node in accordance with an embodiment of the present invention.

FIG. 2 is a schematic block diagram of a node 200 that is illustratively embodied as a storage system comprising a plurality of processors 222$a,b$, a memory 224, a network adapter 225, a cluster access adapter 226, a storage adapter 228, and non-volatile memory 230 interconnected by a system bus 223. The node 200 is preferably embodied as a dual processor storage system executing a storage operating system 300 that implements a high-level module, such as a file system, to logically organize information as a hierarchical structure of named data containers, such as directories and files, on the disks. However, it will be apparent to those of ordinary skill in the art that the node 200 may alternatively comprise a single or more than two processor system. Illustratively, one processor 222$a$ executes the functions of the N-module 310 on the node, while the other processor 222$b$ executes the functions of the D-module 350.

The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

The non-volatile memory 230 comprises electronic storage illustratively embodied as a solid-state, non-volatile random access memory (NVRAM) array having either a back-up battery or other built-in last-state-retention capabilities (e.g., non-volatile semiconductor memory) that hold the last state of the memory in the event of any power loss to the array. As described herein, a portion of the non-volatile memory 230 is organized as temporary, yet persistent, non-volatile log storage (NVLOG 400) capable of maintaining information in the event of a failure to the storage system.

The memory 224 illustratively comprises storage locations that are addressable by the processors and adapters for storing software program code. A portion of the memory may be further organized as a buffer cache 240 for holding data structures, such a buffer cache blocks, associated with the present invention. The processor and adapters may comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over the network 140, which may comprise point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the in formation is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 300 implements a file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that may be exported as named logical unit numbers (luns).

Figure 3:
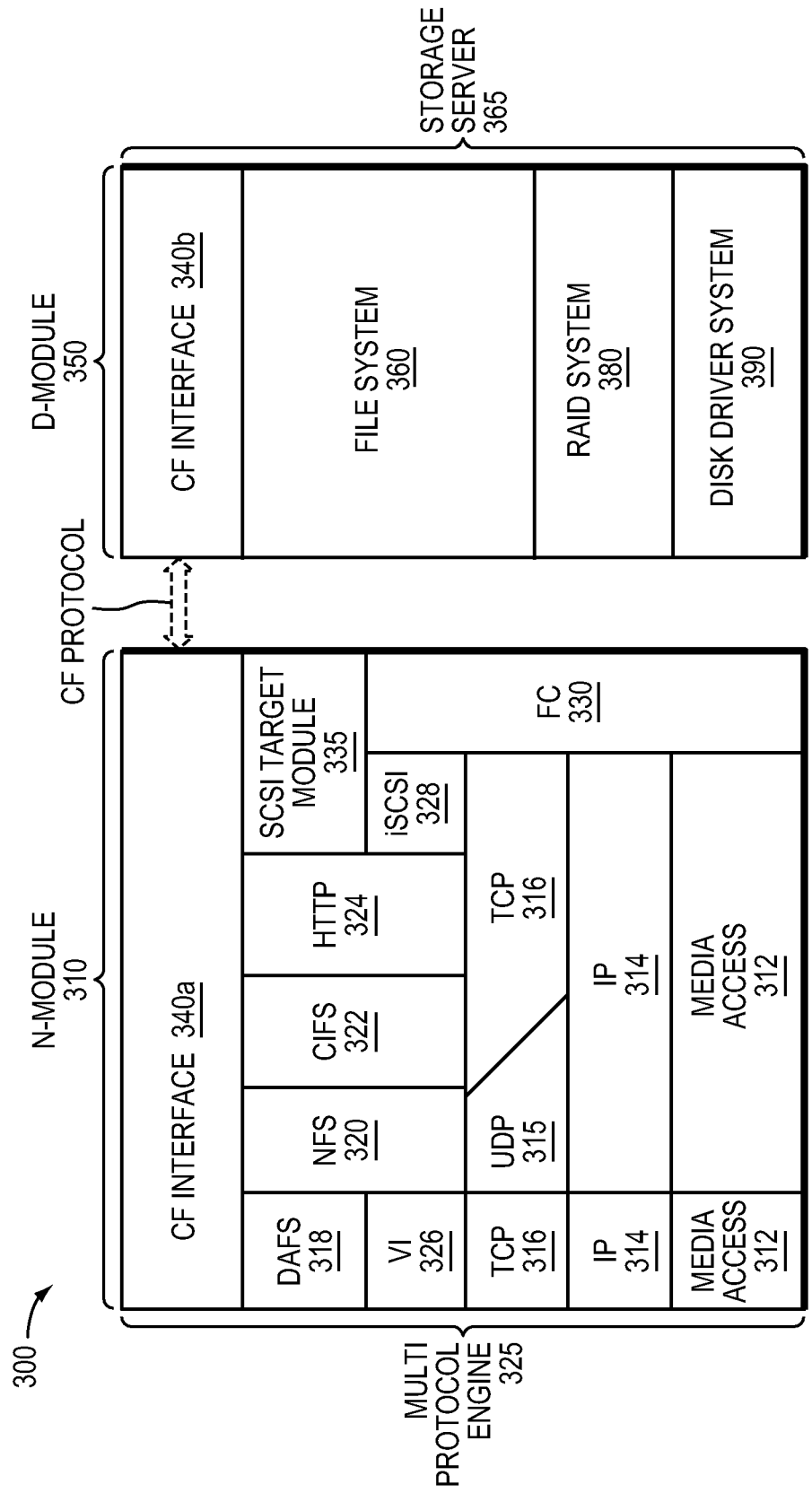
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, may include support for the Direct Access File System (DAFS) protocol 318, various versions of the NFS protocol 320, the Common Internet File System (CIFS) protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "log-structured file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these metadata files include, among others, an inode file. A file handle, i.e., an identifier that includes an inode number, is used to retrieve an inode from disk.

Operationally, a request from the client 180 is forwarded as a set of one or more packets over the computer network 140 and onto the node 200 where it is received at the network adapter 225. A network driver (of layer 312 or layer 330) processes the packet and, if appropriate, passes it on to a network protocol and file access layer for additional processing prior to forwarding to the log-structured file system 360. Here, the file system generates operations to load (retrieve) the requested data from disk 130 if it is not resident "in-core", e.g., in buffer cache 240. If the information is not in the buffer cache, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in the buffer cache for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

In an illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intracluster communication among the modules.

The protocol layers, e.g., the NFS/CIFS layers and the iSCSI/FC layers, of the N-module 310 function as protocol servers that translate file-based and block-based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Communication between the N-module 310 and D-module 350 is illustratively effected through the use of message passing between the modules although, in the case of remote communication between an N-module and D-module of different nodes, such message passing occurs over the cluster switching fabric 150. A known message-passing is mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message/request as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF protocol request and processes the file system command.

It is important to note how the persistent reply cache described herein may provide its basic function of avoiding spurious request re-execution, both when a reply to the client is lost (i.e., a client protocol reply) and when a reply to the N-module is lost (i.e., a CF protocol reply). For example, the CF protocol might be configured to utilize CF identifiers for requests made by the N-module to the D-module. Although use of those identifiers as the basis of the persistent reply cache would address the loss of CF protocol replies, an issue would still exist concerning the loss of client protocol replies. In an illustrative embodiment, the CF protocol may be instead configured to pass client protocol request identifiers as part of the CF protocol request. These latter client request identifiers can be used as the basis of the persistent reply cache, such that the resulting implementation provides protection against the loss of either the CF protocol replies or the client protocol replies.

Persistent Reply Cache Integrated with File System

As noted, the present invention is directed to a system and method for integrating a persistent reply cache with the operation of a file system executing on a storage system. Implementation of the persistent reply cache described herein is generally dependent on the operation of the file system, such as the log-structured file system 360, which operates in an integrated manner with the use of non-volatile memory 230, a portion of which is organized as the NVLOG 400. Many requests executed (processed) by the log-structured file system 360 are recorded in the NVLOG, with each request being considered complete once the NVLOG record is marked complete. Execution of these requests generally requires some type of state change and, as such, the requests are considered non-idempotent requests including, e.g., rename requests.

As an example, assume the file system executes a client request (forwarded by a protocol server of the multi-protocol engine 325) to rename a file from A to B. Broadly stated, the file system 360 executes (processes) the request by, e.g., retrieving appropriate blocks of a directory from disk 130, loading the blocks into the buffer cache 240 and changing (modifying) the blocks, including an appropriate block (entry) of the directory to reflect renaming of the file to B. The file system then marks the modified buffer cache blocks, including the directory entry block that now contains the name B for the file, as "dirty" so that they may be written to disk. At this point, the file system 360 does not write the dirty blocks to disk, but instead waits until execution of a consistency model event, e.g., a consistency point (CP), of the system.

Meanwhile, the file system creates a file system operation record of the request and stores the record in the NVLOG 400. Subsequently during the CP, the contents of the record are not written (flushed) to disk, but rather the processing results of those contents (as represented in the dirty buffer cache blocks) are flushed to disk. That is, only the dirty buffer cache blocks (and not the file system operation record) are written to disk. However, once the changes to be made to the file system are essentially reflected in the file system operation record and stored in the NVLOG, processing of the request is considered complete and the file system notifies the protocol server of such completion. The protocol server thereafter generates a reply containing information indicating, e.g., a successful completion of the request, and returns the reply to the client 180.

Figure 4:
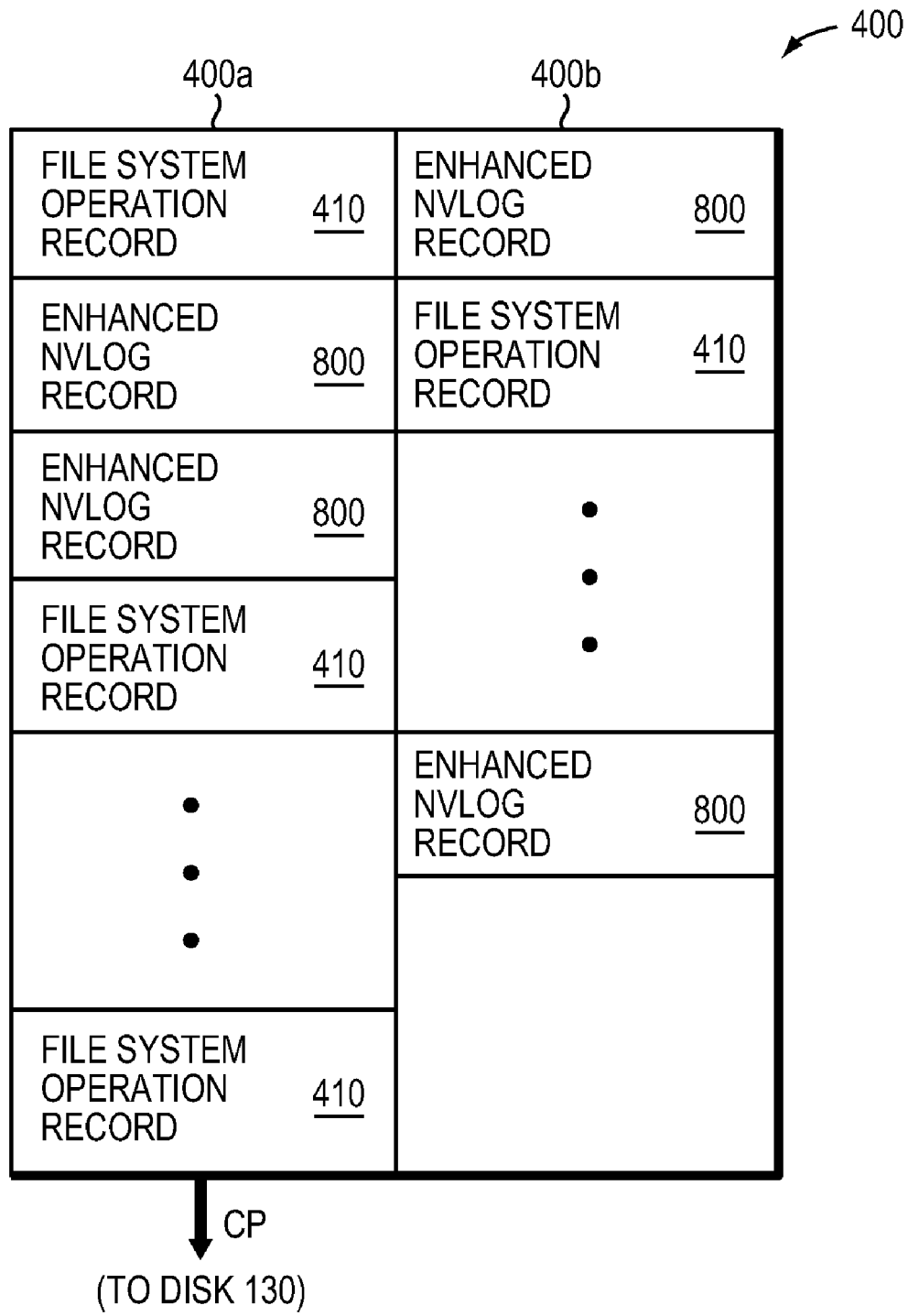
FIG. 4 is a schematic block diagram of a reply cache enhancement to a non-volatile log (NVLOG) that may be advantageously used with the present invention.

FIG. 4 is a schematic block diagram of a reply cache enhancement to the NVLOG 400 that may be advantageously used with the present invention. In an illustrative embodiment, the reply cache enhancement involves enhanced NVLOG records 800 intermixed among file system operation records 410 within the NVLOG 400. The NVLOG is illustratively apportioned into two halves 400a,b comprising a plurality of entries or records, each of which represents one request (i.e., a file system operation). The file system stores the records of processed requests in a first half 400a of the NVLOG until that half of the log is fully populated, at which time a CP is triggered. The file system 360 then stores processed requests in records of a second half 400b of the log. Once the CP completes, that entire first half of the NVLOG is invalidated so that the records contained therein can be reused/recycled. This is primarily because the records are only needed in the event of a failure (e.g., a power-down) of the storage system, which results in loss of changes made to the buffer cache that have not been written to disk as part of a CP. Once the CP completes, the NVLOG records associated with those requests can be discarded.

According to the invention, a file system operation record 410 may be enhanced to include one or more fields that contain "reply cache" information. As used herein, reply cache information denotes information, including the contents of a reply, indicating that a request was previously processed (executed) by the file system so that if the request were to be reissued (e.g., by the client) for any reason, the same reply can be resent to the client (instead of re-executing that previously executed request, which could result in an inappropriate error reply). In an illustrative embodiment, these reply cache information fields may be appended to the file system operation record 410 (to form the enhanced NVLOG record 800) or the reply cache information can be integrated within fields of the enhanced 800. Notably, implementation of the persistent reply cache involves enhancements to the file system operation record 410 that include the necessary information to reconstruct the associated reply cache changes.

Once recorded in the NVLOG 400, a request is considered complete and a response (reply) can be generated. Considering a request complete represents a guarantee that any file system change, together with any associated change to the persistent reply cache, will be consistently stored on final persistent storage, e.g., disk. Upon incorporation into a CP, storage of the request's changes on disk is effectively performed. Until that time, however, the presence of the request information in the NVLOG 400 is the means whereby that guarantee is ensured. If the storage system reboots (initializes), the on-disk file system is at the state represented by the last CP. Any records present in the NVLOG after storage system initialization are re-executed so that the file system on-disk structures can be brought to the state represented by all requests that have been acknowledged, and securing the guarantee represented by that acknowledgement.

In an illustrative embodiment, the persistent reply cache is embodied as a file comprising a combination of contents of (i) one or more enhanced NVLOG records, (ii) dirty in-core buffer cache data structures, and (iii) on-disk data structures corresponding to those dirty buffer cache data structures. Changes made to the reply cache file (as represented by the dirty buffer cache structures storing the results of the NVLOG record contents) are written and committed to the corresponding on-disk data structures during the CP. Once that committal takes place, the associated enhanced NVLOG records 800 can be discarded, since the file system changes (including those to the persistent reply cache) have been committed to disk. Until that point, however, the NVLOG records must be maintained for use in the event of a system reboot or loss of power. Because there has been no effective commitment of changes represented by these NVLOG records to disk, the only way that the changes represented by these records (both with regard to "normal" file system state and persistent reply cache state) can be realized (e.g., in the event of such a power loss) is to provide for the re-execution of these NVLOG records on system restart.

As further noted, integration of the persistent reply cache file with file system operation is illustratively achieved through atomic operation of the reply cache with the file system to store information associated with a reply, e.g., to a client request, on electronic storage implemented as in-core buffer cache memory of the storage system, as well as on magnetic storage implemented as disks of the system. To that end, the invention takes advantage of the file system consistency model described herein to ensure that contents of the reply cache (including dirty in-core buffers, on-disk structures and information in enhanced NVLOG records) are always consistent with the other contents of the file system (also including dirty in-core buffers, on-disk data structures and information in NVLOG records).

On-Disk Structure of Reply Cache

The form of the persistent reply cache on disk (i.e., the on-disk structure of the reply cache) may be configured to reflect the protocols used, as well as the type of load, device and file system characteristics. In an illustrative embodiment, the reply cache is organized as a generic "bin and bucket" structure, although it will be understood to those skilled in the art that other on-disk reply cache organizations can be used in accordance with the teachings of the invention described herein. In such a bin-and-bucket structure, requests from the same source are given their own subsection of the reply cache or "bin". A bin comprises one or more "buckets", wherein each bucket holds a single request recorded in the reply cache. Note that the definition of "from the same source" may vary depending upon the protocol. For example, for the NFS v2, 3 and 4 protocols, requests with the same flow, i.e., the same (i) source (client) and destination (storage system) IP address, (ii) source and destination port, and (iii) protocol number and version, are considered from the same source. For the NFSv4.1 protocol (currently being finalized), requests within the same session are considered from the same source.

In an illustrative embodiment, the file system updates the persistent reply cache file on-disk (via a CP) as blocks are changed. The enhanced NVLOG record and in-core dirty buffer cache blocks are consistently associated with this persistent reply cache file. As a file, the persistent reply cache is defined by an inode (or similar data structure) that organizes the bins and buckets as a single tree structure layout of indirect and direct (data) blocks on-disk, although it will be apparent to those of skill in the art that other on-disk layouts of the reply cache, such as organizing each bin as a file or similar object, may be advantageously used in accordance with the teachings of the invention. Thus, any changes to a particular bin or bucket illustratively involves updating of 4 kB blocks, which may be scattered over the disks in accordance with the write anywhere capability of the log-structured file system.

Further to the illustrative embodiment, each bin has a certain allocated size (e.g., 24 kB) within the persistent reply cache file. For example, the first 24 kB of the file may be allocated for a first bin, the next 24 kB may be allocated for a second bin, etc. Moreover, within each bin, a bucket has a specific location. In the context of a file, the on-disk layout of the persistent reply cache illustratively assumes a simple two dimensional structure, wherein the bins comprise a first dimension and, within each bin, the buckets comprise a second dimension, although other on-disk layout structures may also be employed.

Figure 5:
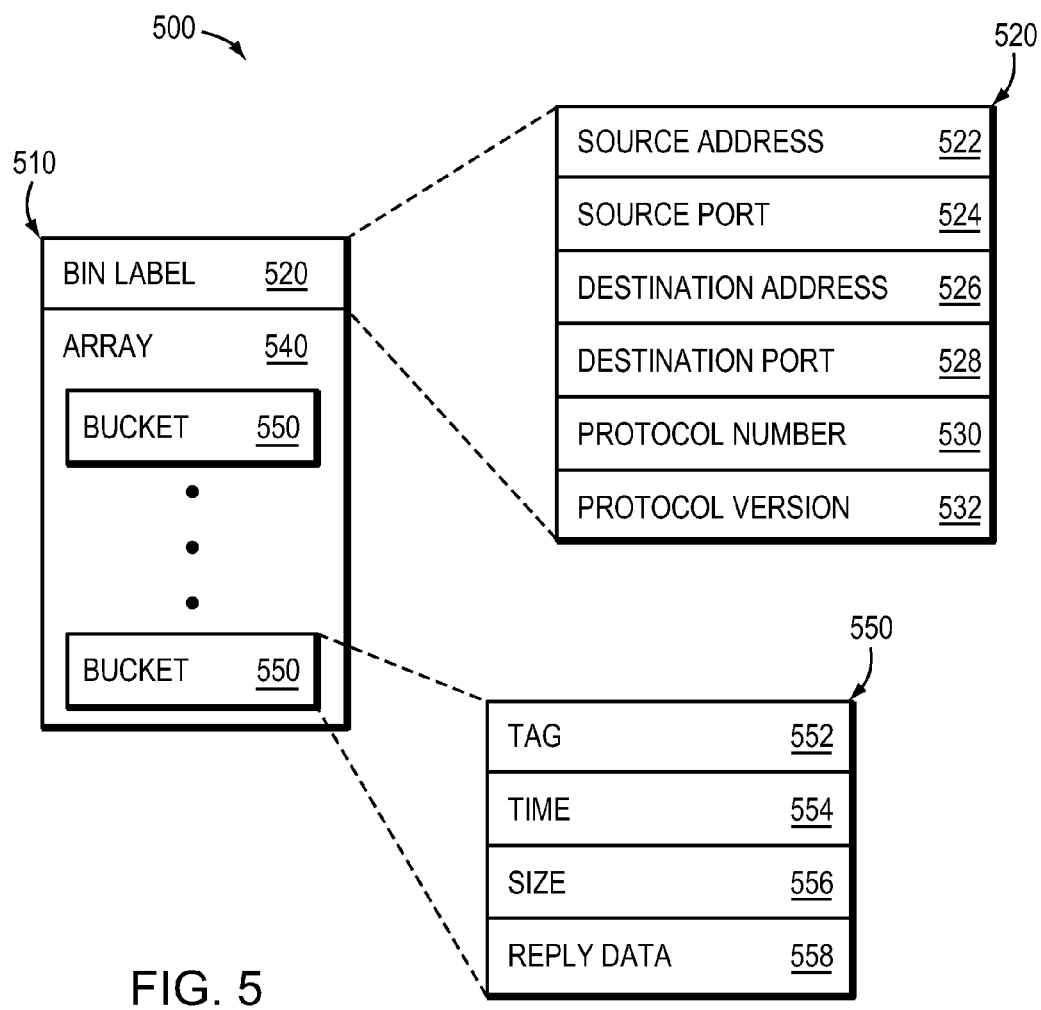
FIG. 5 is a schematic block diagram of an on-disk structure of a persistent reply cache that may be advantageously used with the present invention.

FIG. 5 is a schematic block diagram of an on-disk structure 500 of the reply cache that may be advantageously used with the present invention. A bin 510 is a data structure having a bin label 520 and an array 540 of bucket data records. The bin label 520 illustratively defines a flow pertaining to a particular source of requests issued to the storage system, i.e., the request flow. To that end, the bin label 520 comprises a source (IP) address 522 of the source (e.g., a client) of the requests stored in the bin, a source port number 524 of the client for those requests, a destination (IP) address 526 of the destination (e.g., the storage system) of the requests, a destination port number 528 of the storage system for the requests, a (RPC) protocol number 530 for the requests and a (RPC) protocol version 532 for the requests.

The array 540 includes a plurality of bucket data records (buckets 550), wherein each bucket 550 contains a time value 554 or "timestamp" indicating the time the bucket was created or last accessed, a size value 556 indicating the size of reply data 558 for the bucket, and a tag 552 identifying the bucket. For NFSv2-v3, the tag 552 is illustratively a transaction identifier (XID) of the request, whereas for NFSv4 (which allows multiple file system operations within a single NFS request) the tag comprises the combination of the XID and position of any individual file system operations associated with an NFS COMPOUND request. In general, whenever a single client protocol request results in multiple operations at the file system level (as, e.g., when processing that request results in issuance of more than one CF protocol request), the structure of the tag must make provision for distinct values for each of the issued file system requests in order to perform the client protocol request.

It should be noted that the NFSv4 protocol organizes its requests differently than NFSv2 and v3. The NFS v2 and v3 protocols define a number of individual (RPC) procedures, such as rename, remove, read and write, each of which is embodied as a request. However, the NFSv4 protocol defines only one request, called "COMPOUND", which illustratively contains a series of such procedures. The COMPOUND request thus allows execution of multiple file system procedures/operations in a single request. Therefore, reply cache information associated with the COMPOUND request denotes the position of the actual procedure (e.g., file system operation) within that request. For example, the COMPOUND request may comprise lookup, remove and rename procedures, with each of those procedures representing a separate operation to the file system. The COMPOUND request is illustratively parsed within the appropriate protocol server (e.g., NFS server 320) of the multi-protocol engine 325 and each of its constituent operations is individually sent to the file system for execution. Accordingly, each operation has its own reply cache record.

In-Core Structure of Reply Cache

Figure 6:
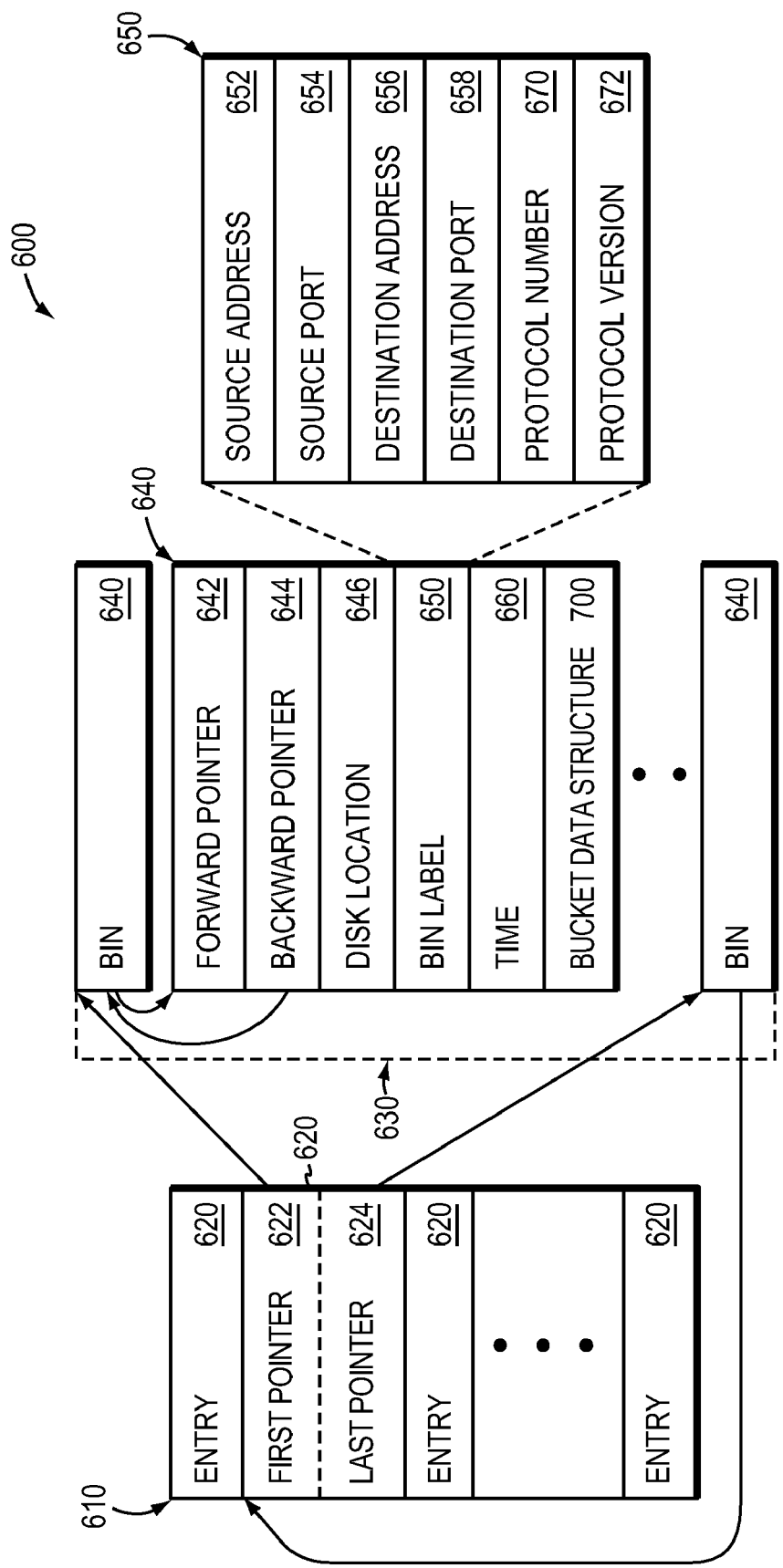
FIG. 6 is a schematic block diagram of an in-core bin data structure of the reply cache that may be advantageously used with the present invention.

In an illustrative embodiment, an in-core reply cache structure is provided that corresponds to the on-disk reply cache structure. Accordingly, the in-core reply cache structure illustratively includes both bin and bucket data structures 600 and 700, respectively, although other in-core reply cache structures can be advantageously used (with, of course, corresponding on-disk structures). An example of such an in-core reply cache structure is disclosed in U.S. patent application Ser. No. 12/148,930 titled, FlowBased Reply Cache, which is hereby incorporated by reference as though fully set forth herein. FIG. 6 is a schematic block diagram of an in-core bin data structure 600 of the reply cache that may be advantageously used with the present invention. The in-core bin data structure 600 comprises a hash table 610 containing a plurality of entries 620. The hash table 610 is used to locate bin entries in the reply cache and is illustratively based on the low-order bits of a conventional hash function directed to the request flow, e.g., the contents of the bin label. Each hash table entry 620 contains first and last pointers 622, 624 to the first and last bin entries 640 of a chained data structure, illustratively embodied as a circular list 630, which entries share a value for the low-order bits of the hash of the bin label.

Each bin entry 640 includes a forward pointer 642 that references (points to) the next bin entry (or the head of the list 630 on the last entry) and a backward pointer 644 that points to the previous bin (or head of the list on the first entry). Each bin entry or "bin" 640 also includes a disk location 646 (illustratively expressed as an offset within the associated file) of the on-disk reply cache structure corresponding to the bin, a bin label 650, a time value 660, and an in-core bucket data structure 700. The contents of the bin label 650 are similar to bin label 520 and, to that end, illustratively comprise a source address 652 of the client issuing the requests stored in the bin, a source port number 654 of that client, a destination address 656 of the storage system, a destination port number 658 of the storage system, an RPC protocol number 670 for the requests and an RPC protocol version 672 for the requests. The time value 660 or timestamp indicates the time the bin 640 was created or last accessed.

Figure 7:
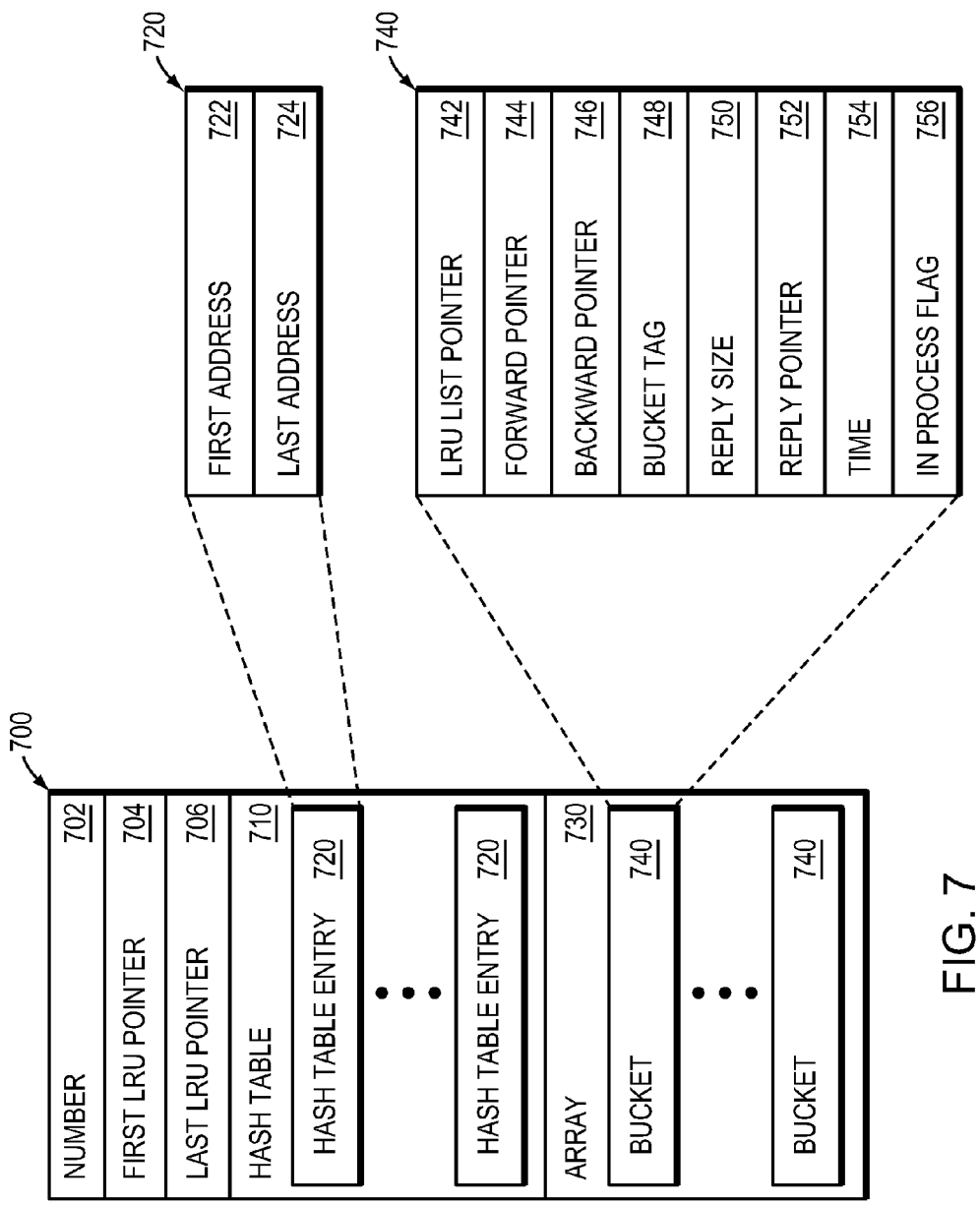
FIG. 7 is a schematic block diagram of an in-core bucket data structure of the reply cache that may be advantageously used with the present invention.

FIG. 7 is a schematic block diagram of an in-core bucket data structure 700 of the reply cache that may be advantageously used with the present invention. The in-core bucket data structure 700 illustratively comprises various fields including a number field 702, a first least recently used (LRU) pointer field 704, a last LRU pointer field 706, a hash table field 710 and an array field 730. The array field 730 holds an array of bucket entries or "buckets" 740 associated with the bin, whereas the number field 702 holds a value (number) indicating the number of buckets 740 in the associated bin. In an illustrative embodiment, the buckets 740 of array 730 are organized into a LRU list (not shown) that facilitates recycling of the buckets in the event that there is shortage of resources (memory). To that end, the first LRU pointer field 704 holds a first LRU pointer that references a most recently used bucket 740 within the array 730 and the last LRU pointer field 706 holds a last LRU pointer that references a last recently used bucket 740 of the array.

The hash table field 710 of the bucket data structure 700 is configured to organize a hash table used to locate buckets. The hash table 710 is illustratively based on the low-order bits of a hash of tag values for the buckets ("bucket tags") and includes a plurality of hash table entries 720, wherein each hash table entry 720 is associated with a particular value of the low-order bits of the hash of the bucket tag. For efficiency, the buckets 740 of array 730 are also illustratively organized into a series of separate "hash chains" (not shown) referenced by the entries 720. As a result, each hash table entry 720 contains a first (memory) address 722 and a last (memory) address 724 that reference first and last buckets of a chain (or set) of buckets within the bin 640 that share those low-order bits. Thus, each bucket 740 of the array 730 belongs to one of a series of hash chains and to the LRU list for the bin (there is one LRU list per bin). In operation, the hash chain may be used to find a bucket having a particular tag; however, if the bucket cannot be located, then an existing bucket must be "freed-up" or recycled to essentially provide a storage (memory) location for that bucket. The LRU pointers (i.e., the last LRU pointer) are used to locate buckets for recycling purposes.

Each bucket 740 comprises a LRU list pointer 742 that references a next entry on the LRU list, i.e., the next least recently used entry (or NULL if this is the least recently used entry), a forward pointer 744 that references a next bucket of its hash chain having the same low-order hash bits (or the head of the hash chain on the last entry), and a backward pointer 746 that references the previous bucket of the hash chain having the same low-order hash bits (or head of the hash chain on the first entry). Note that the forward and backward pointers 744, 746 facilitate removal of the bucket from the middle of a chain. In contrast, there is only one LRU list pointer 742 because when recycling an existing bucket from the LRU list, the referenced bucket is always removed from an end of the list.

The bucket entry 740 also comprises a request bucket tag 748, e.g., an XID, a reply size value 750 indicating the size of the reply data for this bucket entry, and a reply pointer 752 that points to the location of the reply data in memory. Note that the reply data is referenced by the pointer because it is generally variable in length; otherwise, the reply data may be included in the bucket entry 740. Lastly, the bucket entry 740 comprises a time value 754 or timestamp indicating the time that the entry was created or last accessed, and an in process flag 756 (described further herein).

Enhanced NVLOG Record Structure

Figure 8:
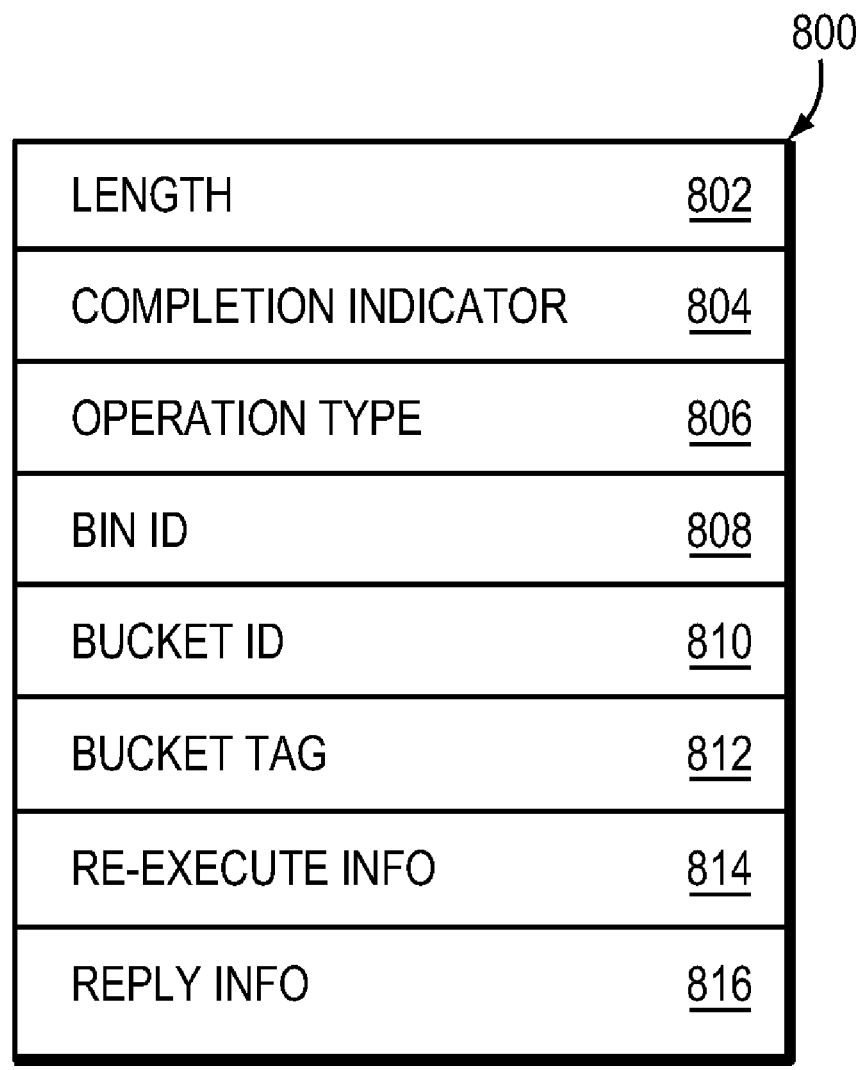
FIG. 8 is a schematic block diagram illustrating an enhanced NVLOG record of the reply cache that may be advantageously used with the present invention.

FIG. 8 is a schematic block diagram illustrating an enhanced NVLOG record 800 of the reply cache that may be advantageously used with the present invention. Illustratively, each NVLOG record 800 is embodied within non-volatile electronic storage (e.g., the NVLOG 400) of the storage system and includes file system operation information 810 as well as a length value 812 indicating the length of the record. The NVLOG records may have differing lengths, depending upon the requests recorded therein, e.g., a write request record includes write data associated with the request and, thus, may be relatively long in length, whereas a rename request typically includes two file names and is thus relatively short in length. A completion indicator 814 stores an indication that marks the record as complete. Marking of the record as complete (e.g., asserting the completion indicator) is the last task performed by the file system 360 to atomically complete execution of the request so that, in the event of a system power down, an incomplete record is not accessed/processed. The atomicity involved with completing such a record ensures consistency between the file system state and the reply cache state.

In an illustrative embodiment, an update specified by the request that changes the state of the persistent reply cache typically involves changes to, e.g., one or more portions of a data container, e.g., a file, represented in the reply cache. Such changes can be performed by program code similar to the code that updates data structures within the rest of the file system. Just as with more typical file system changes, the changes to the reply cache state are performed by writing to buffers in memory 224 (e.g., buffer cache blocks). During a CP, these state changes include reply cache changes together with other file system changes. Because of the nature of a CP as an atomic "all-or-nothing" update to the file system state, reply cache changes are always included with the changes for the request that they represent.

The enhanced NVLOG record 800 also includes an operation type 816 indicating the type of operation (request) associated with the record. A bin identifier (ID) 818 comprises an ID (e.g., in the form of an index) into an in-core data structure, such as a table, having a set of pointers to the bins 640 of the in-core bin data structure 600. That is, the file system maintains an in-core "bin mapping" table used to locate an in-core bin 640 based on an ID (in the form of an index). Note that there is also an index (via a bin ID) into an on-disk data structure, such as a file, used to locate bins 510 on disk. Similarly, a bucket ID 820 comprises an ID (e.g., in the form of an index) into in-core and on-disk data structures to buckets within a bin. A bucket tag 822 identifies the bucket uniquely within the bin and, to that end, comprises information used to determine whether a given request matches a previously processed request. Illustratively, the tag 822 is an XID of the request (for NFSv2-v3) or the combination of the XID and ordinal position of a file system operation associated with an NFS COMPOUND request (for NFSv4).

The ordinal position of the file system operation within the NFS COMPOUND request is recorded in order to reply back properly to the N-module when the CF protocol is used or otherwise to provide information to allow partially executed requests to be properly resumed when the requests are reissued. For example, assume a system power down occurs and the storage system reboots during execution of the COMPOUND request. In response, the NFS server 320 starts reprocessing (e.g., re-parsing) the operations included in the request. To that end, the NFS server may issue an operation (e.g., a rename operation) in ordinal position 2 of the COMPOUND request to the file system for execution. The file system 360 then examines the reply cache to determine whether it had previously executed that operation. In order to make this determination, the file system searches for a record 800 having, inter alia, a particular bucket tag 822 (e.g., XID and ordinal position for NFSv4, XID for NFSv2, 3). If the operation was executed, then the file system returns the answer (reply) in the matching reply cache record. When requesting execution of subsequent operations in the COMPOUND request, those operations will have a bucket tag with the same XID and higher ordinal positions. Depending on whether they had been previously executed, the subsequent operations will either be found in the reply cache (if previously executed) or not, thus indicating they need to be executed for the first time.

The NVLOG record 800 further includes re-execute information (info) 824 including parameters of the request, as well as any choices made in request processing, needed to re-execute the request in the event of a storage system reboot. For example, for a rename request (renaming file A to B), the re-execute info 824 may include information such as (i) the filename B, (ii) the Mode number of file B, (iii) the rename operation, etc. Note that the fundamental purpose of the NVLOG record is to re-perform the operation reflected in the record because it had not been flushed to disk (since the CP had not completed). Note also that it is not sufficient that the file system merely re-execute the operation and flush the result to disk; the file system must guarantee that the result of the re-execution is exactly the same as the previous result. For example, if name A was removed the first time, name A is also removed the second time. Reply info 826 contains either the reply to the request or information sufficient to generate the reply.

Operation of the Persistent Reply Cache

The following descriptions illustrate example operational procedures involving the persistent reply cache of the present invention. Broadly stated, a client sends a request (e.g., an NFS request) to the storage system, where the request "traverses" the multi-protocol engine 325 to a protocol server (e.g., NFS server 320), which performs its processing of the request. As part of that processing, the NFS server prepares a message that instructs the file system 360 as to the operation specified by the request. If the file system protocol does not support reply cache processing or if the request is an idempotent request, then reply cache processing is not needed. Otherwise, the NFS server "tags" the message (e.g., with a flag of a message header) to indicate to the file system that the request supports reply cache processing, inserts the bin ID and bin label in the message, and forwards the message to the file system.

In an illustrative embodiment, the NFS server 320 queries the file system as to the bin ID corresponding to a particular bin label (or flow). Upon receiving the corresponding bin ID, the NFS server locally stores that ID so that when it receives a request having that flow, it can forward the bin ID associated with the request to the file system 360. If this is a first request received from this client (source), the file system creates the bin and an associated bin ID. For example, the file system creates a bin 640 and its entries using, inter alia, the flow information provided by the NFS server. The flow is hashed, placed on an appropriate hash chain (using the appropriate pointers) and assigned a disk location.

In response to receiving the message with the bin ID and bin label, the file system locates the correct bin and verifies that the bin label matches the label in the request. Note that the bin label is passed in the message because it is possible that the in-core bins may be "timed out" of their memory locations. If the bin labels do not match, an error is generated that instructs the file system to create a bin for the flow. However, if the labels do match, then the bin ID is a valid location pointer to a bin and its associated array of buckets in memory. The file system then hashes a (bucket) tag (e.g., the XID) of the request and uses the low-order bits of that hash to select an appropriate hash table entry 720 of hash table 710. Starting from the first address (pointer) 722 in the hash table entry 720 (hash chain), the file system searches the hash chain for a bucket 740 with a matching bucket tag 748. If the matching tag is found, the file system determines whether the in-core bucket is marked "in process".

Note that two situations may arise upon finding a matching bucket entry. One situation is that the request has been executed and, as such, is a duplicate so that the file system need only return a copy of the reply stored in the reply cache. The other situation is that the file system is currently executing the request, i.e., processing of the request has not yet completed. Typically, this latter situation arises where the storage system has taken a "long time" to respond (due to interference or file system latency) such that the client sends another copy of the request, assuming that the original must have been dropped. For this in-process situation, it is undesirable for the file system to re-execute the request; yet there is no reply to return.

Thus, if the bucket 740 is marked in-process (e.g., by asserting the in process flag 756), then the file system returns (to the NFS server) an indication of this in-process situation or, alternatively, waits until the in-process condition is cleared. In the former situation, the server merely "drops" (ignores) the request and does not respond to the client until processing of the original request completes, at which time a reply is generated. Once processing completes, the file system clears the in progress flag 756 for the request (bucket 740). Thereafter (or if the bucket is not marked in-process), the reply information in the bucket 740 is located (using the reply pointer 752) and provided to the NFS server, along with an indication that the request is a duplicate, such that the server can return the reply to the client.

However, if a matching tag is not found, then the file system removes the least recently used bucket from the LRU list and removes that bucket from its (old) hash chain. To that end, the file system hashes the (old) bucket tag of that entry, selects the old hash chain and then removes the bucket from that chain. The file system then modifies the bucket to reflect the request, sets (changes) the bucket tag and marks the flag 756 of the entry as in-process. Thereafter, the bucket tag is hashed, an appropriate hash chain is selected, and the bucket is loaded onto that selected hash chain. The bucket is then initialized with information that can be derived from the request and that is useful in generating a reply, such as parameters of the request. Further, the in-core memory address of the bucket is saved in, e.g., a data structure of the file system that stores information relevant to processing of the request. The file system then completes processing of the request, i.e., it completes initializing and setting up its in-core bin and bucket data structures for this request, and completes execution of the rename operation. The file system thereafter stores the reply information (via reply pointer 752 to the location of the information in memory) in the bucket 740.

Figure 9:
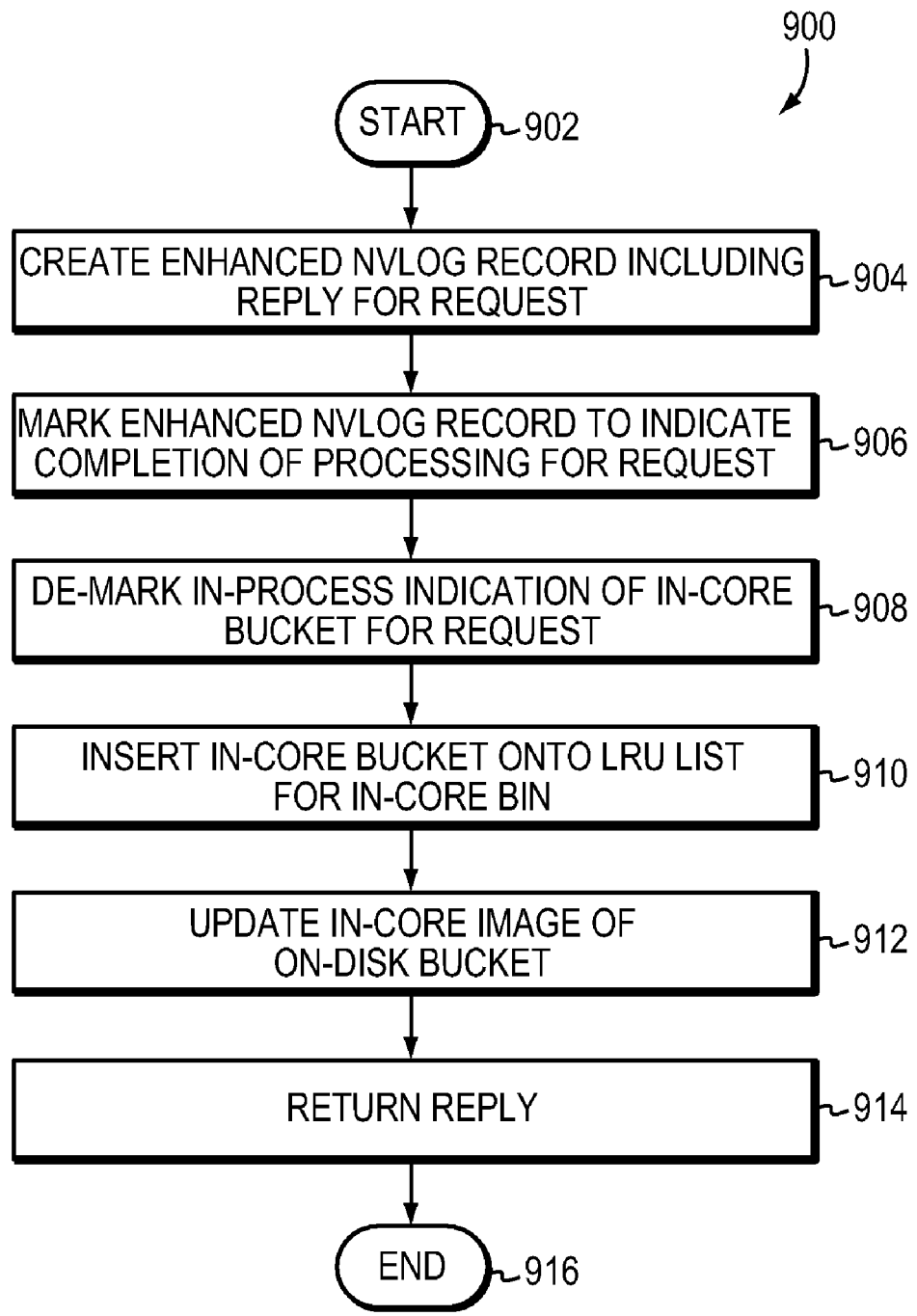
FIG. 9 is a flowchart illustrating an example procedure directed to operations attendant upon completing execution of a request in accordance with the persistent reply cache of the present invention.

FIG. 9 is a flowchart illustrating an example procedure directed to operations attendant upon completing execution of a request in accordance with the persistent reply cache of the present invention. The procedure 900 starts at Step 902 and proceeds to Step 904 where the file system creates an enhanced NVLOG record 800, including reply information, for the request. It should be noted that the enhanced NVLOG record is illustratively created once the file system completes processing of the (rename) request, although it will be understood to those of skill in the art that the record could have been created before such processing completes. In Step 906, the file system marks the completion indicator 804 of the NVLOG record 800 as complete, indicating that the operation (request) is effectively performed. In Step 908, the in-process indication of the bucket for the request is de-marked (e.g., by de-asserting the in-process flag 756) and, in Step 910, the bucket is inserted onto the LRU list for the array 730 of the bin (i.e., in-core bucket data structure 700) at the most recently used end (as referenced by the first LRU pointer 704).

In Step 912, the file system updates the in-core image of the on-disk bucket information to reflect the new information (i.e., stored in dirty buffer cache blocks) of the corresponding bucket. As noted, the file system maintains buffer cache 240 for storing (old) information in disk blocks that it subsequently processes (modifies). The buffer cache 240 illustratively comprises the on-disk image of those blocks on the disk, preferably so that they do not have to be read from disk. Blocks that have been modified with the new information and have not yet been written to disk are stored in dirty buffer cache blocks. In other words, the in-core manifestation of the persistent reply cache comprises both "clean" and dirty buffer cache blocks. In this context, the term "clean" denotes dirty buffer cache blocks that have been written to disk (during a CP) but that have not been invalidated (discarded) from the buffer cache. A clean buffer cache block thus exactly matches its corresponding on-disk block. If there were infinite memory resources in the storage system, it would be preferable to maintain these clean blocks in the buffer cache blocks so that there would be no need to subsequently read them from disk. Since there are not infinite resources, the buffer cache is also organized on an LRU basis and if some clean blocks have not been accessed for some time, they are discarded.

Note that Step 912 corresponds to those portions of the on-disk structure (FIG. 5) as reflected by the dirty blocks of the buffer cache (e.g., label/flow, tag, time, size, reply data). Note also that the in-core data structures (FIGS. 6 and 7) as well as these buffer cache structures have different purposes, i.e., the in-core structures are organized to facilitate use in processing, whereas the buffer cache structures are organized to facilitate writing to disk (during a CP).

Upon completion of the CP, the NVLOG record 800 is complete, the buffer cache structures have been modified and updated, and the in-core bin and bucket structures are consistent. Note that upon marking the NVLOG record complete, the file system has atomically executed the (rename) request and updated the persistent reply cache to reflect the fact that it has executed the rename. In Step 914, the reply is returned to the client (via the NFS server) and the procedure ends at Step 916.

Figure 10:
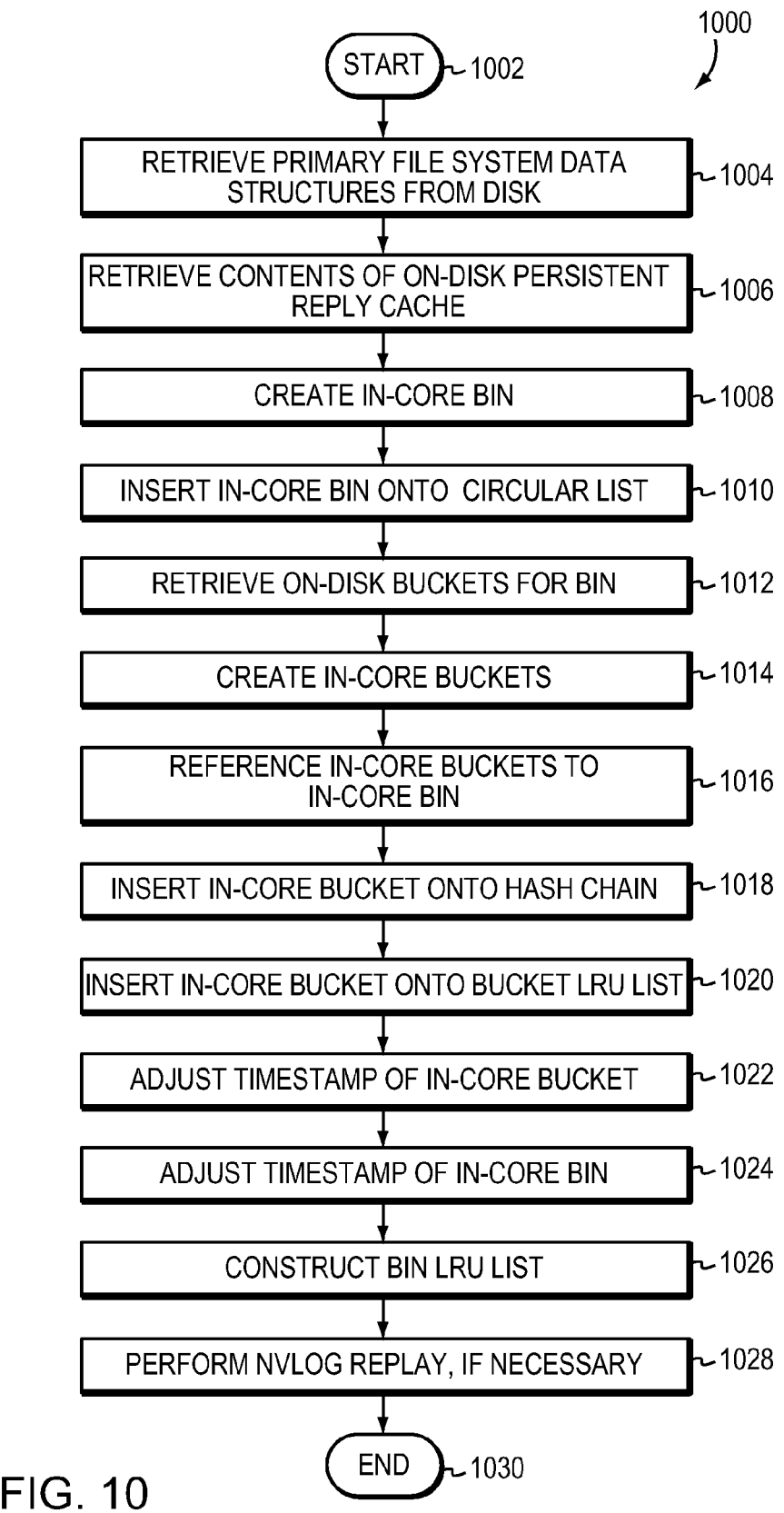
FIG. 10 is a flowchart illustrating an example procedure directed to operations performed as part of system restart in accordance with the persistent reply cache of the present invention.

FIG. 10 is a flowchart illustrating an example procedure directed to operations performed as part of system restart in accordance with the persistent reply cache of the present invention. In particular, this procedure is performed in response to a storage system power down (e.g., a clean system shut down or a system failure). The procedure 1000 starts at Step 1002 and proceeds to Step 1004 where the file system reads (retrieves) primary file system data structures from disk to enable retrieval of persistent reply cache information stored on disk. In an illustrative embodiment, the primary file system data structures retrieved by the file system include (i) a file system information block, (ii) an inode file, and (iii) a proper inode for the persistent reply cache file to thereby enable retrieval of that file's data and metadata contents.

In Step 1006, the file system retrieves the necessary contents, i.e., the bin and bucket structures, of the on-disk persistent reply cache file and, thereafter, adds each on-disk bin structure to the (initially empty) set of in-core bin structures (FIG. 6). To that end, in Step 1008, the file system creates an in-core bin corresponding to each appropriate on-disk bin and, in Step 1010, inserts the created in-core bin onto the circular list 630 based on a hash of the bin label. Note that the construction of the LRU list may be deferred to a later step. In Step 1012, for each bin, the file system retrieves the array of buckets 550 from disk.

The file system then adds each on-disk bucket 550 to the (initially empty) set of in-core buckets 740 (FIG. 7) for the associated in-core bin 640. To that end, in Step 1014, the file system creates an in-core bucket 740 corresponding to each appropriate on-disk bucket 550 and, in Step 1016, references (points) the in-core buckets 740 to their associated in-core bin 640. In Step 1018, the file system inserts each in-core bucket 740 onto an appropriate hash chain based on a hash of the bucket tag 748 and, in Step 1020, inserts the in-core bucket onto a bucket LRU list at a proper location based on timestamp 554 from the corresponding on-disk bucket 550. In Step 1022, the file system adjusts the timestamp 754 of the associated in-core bucket 740 to reflect the timestamp 554 of the on-disk bucket 550 and, in Step 1024, adjusts the timestamp 660 of the associated in-core bin 640 if the timestamp 754 of the bucket 740 is later than the timestamp 660.

In Step 1026, the file system constructs the LRU list for the in-core bins using their timestamps 660 and, in Step 1028, performs an NVLOG replay, if necessary (e.g., not a clean shutdown/restart, such as a panic situation or unexpected reboot). In an illustrative embodiment, NVLOG replay comprises re-execution of each (enhanced) NVLOG record in the NVLOG. As part of the re-execution (e.g., in the case of a rename operation), the file system processes the operation and performs an equivalent update of both the in-core and on-disk structures that correspond to the persistent reply cache entry (enhanced NVLOG record) for that operation. Note that there are two differences between NVLOG replay and the manner in which requests are generally re-executed by the file system: (1) The file system does not search for a bucket with a matching tag. Instead, it immediately selects a new bucket (e.g., from the LRU list) and stores the information for the request in that bucket. (2) The storage system does not return a reply to the client because it is only re-executing the request. The procedure then ends at Step 1030.

While there have been shown and described illustrative embodiments for integrating a persistent reply cache with operation of a file system executing on a storage system, it is to be understood that various other adaptations and modifications may be made within the spirit and scope of the present invention. For example, as noted, the results (i.e., dirty buffer cache blocks) of all new enhanced NVLOG records in the persistent reply cache are written to disk at a consistency model event (e.g., a CP) of the file system. Depending on the workload, it may be possible to reduce the number of disk blocks of the reply cache file written per CP by using conventional logging techniques. Instead of implementing all changes to the on-disk reply cache immediately as part of the CP, the necessary changes can be written to a sequential on-disk log (e.g., embodied as a sequential file) as a representation of the changes (e.g., as instructions) appended as part of the CP. Periodically (e.g., after a number of CPs), those changes represented in the sequential on-disk log are reflected in the reply cache file on disk, but since many entries will have been overwritten many times in the interim, this technique can result in substantial I/O reduction.

The foregoing description has been directed to specific embodiments of this invention. It will be apparent, however, that other variations and modifications may be made to the described embodiments, with the attainment of some or all of their advantages. For instance, it is expressly contemplated that the components and/or structures described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for performing one or more operations associated with a system restart of a storage system having a persistent reply cache, the method comprising:
retrieving primary file system data structures from one or more storage devices into a memory of the storage system to enable retrieval of persistent reply cache information stored on a storage device;
retrieving on-disk bin and bucket structures of a persistent reply cache file from the storage device into the memory;
adding each on-disk bin structure to an initially empty set of in-core bin structures in the memory;
for each in-core bin structure, retrieving an array of on-disk bucket structures from the storage device;
adding each on-disk bucket structure of the array to an initially empty set of in-core bucket structures for the in-core bin structure; and
processing enhanced non-volatile log (NVLOG) records stored in an NVLOG of the storage system using the in-core and on-disk structures.

2. The method of claim 1 wherein the processing further comprises:
processing an operation associated with each enhanced NVLOG record; and
performing an update of both the in-core and on-disk structures that correspond to each enhanced NVLOG record for the operation.

3. The method of claim 1 wherein adding each on-disk bin structure to an initially empty set of in-core bin structures in the memory further comprises:
creating the in-core bin structure in the memory that corresponds to each appropriate on-disk bin structure; and
inserting the in-core bin structure onto a circular list in the memory based on a hash of a bin label of the bin structure.

4. The method of claim 1 wherein adding each on-disk bucket structure of the array to an initially empty set of in-core bucket structures for the in-core bin structure further comprises:
creating an in-core bucket structure corresponding to each on-disk bucket structure;
referencing each in-core bucket structure to its corresponding in-core bin structure; and
inserting each in-core bucket structure onto an appropriate hash chain based on a hash of a bucket tag of the bucket structure.

5. The method of claim 4 further comprising:
inserting the in-core bucket structure onto a least recently used (LRU) list at a proper location based on a first timestamp from the corresponding on-disk bucket structure; and
adjusting a second timestamp of the in-core bucket structure to reflect the first timestamp of the on-disk bucket structure.

6. The method of claim 5 further comprising adjusting a third timestamp of the in-core bin structure if the second timestamp of the in-core bucket structure is later than the third timestamp.

7. The method of claim 6 further comprising constructing the LRU list for each in-core bin structure using the third timestamp instead of the first timestamp.

8. A system configured to perform one or more operations associated with a system restart of a storage system having a persistent reply cache, the system comprising:
one or more storage devices of the storage system;
non-volatile log storage (NVLOG) of the storage system configured to store one or more enhanced NVLOG records, each enhanced NVLOG record representing a file system operation; and
a file system of the storage system, the file system configured to retrieve primary file system data structures from a storage device into a memory of the storage system to enable retrieval of persistent reply cache information stored on the storage device, retrieve on-disk bin and bucket structures of a persistent reply cache file from the storage device into the memory, add each on-disk bin structure to an initially empty set of in-core bin structures in the memory, retrieve an array of on-disk bucket structures from the storage device for each in-core bin structure, add each on-disk bucket structure of the array to an initially empty set of in-core bucket structures for the in-core bin structure, and process the file system operation represented by each enhanced NVLOG record using the retrieved structures.

9. The system of claim 8 wherein the primary file system data structures retrieved by the file system comprise:
a file system information block;
an inode file; and
an inode for the persistent reply cache file to thereby enable retrieval of data and metadata contents of the file.

10. The system of claim 8 wherein the file system is further configured to:
process an operation associated with each enhanced NVLOG record; and
perform an update of both the in-core and on-disk structures that correspond to each enhanced NVLOG record for the operation.

11. The system of claim 8 wherein the file system configured to add each on-disk bin structure to an initially set of in-core bin structures in the memory, further comprises:
the file system further configured to create the in-core bin structure in the memory that corresponds to each appropriate on-disk bin structure, and insert the in-core bin structure onto a circular list in the memory based on a hash of a bin label of the bin structure.

12. The system of claim 8 wherein the file system configured to add each on-disk bucket structure of an array to an initially empty set of in-core bucket structures for the in-core bin structure, further comprises:
the file system further configured to create an in-core bucket structure corresponding to each on-disk bucket structure, reference each in-core bucket structure to its corresponding in-core bin structure, and insert each in-core bucket structure onto an appropriate hash chain based on a hash of a bucket tag of the bucket structure.

13. The system of claim 12 wherein the file system is further configured to insert the in-core bucket structure onto a least recently used (LRU) list at a proper location based on a first timestamp from the corresponding on-disk bucket structure, and adjust a second timestamp of the in-core bucket structure to reflect the first timestamp of the on-disk bucket structure.

14. The system of claim 13 wherein the file system is further configured to adjust a third timestamp of the in-core bin structure if the second timestamp of the in-core bucket structure is later than the third timestamp.

15. The system of claim 14 wherein the file system is further configured to construct the LRU list for each in-core bin structure using the third timestamp instead of the first timestamp.

16. A non-transitory computer readable medium containing executable program instructions executed by a processor, comprising:
   program instructions that retrieve primary file system data structures from one or more storage devices into a memory of a storage system to enable retrieval of persistent reply cache information stored on a storage device;
   program instructions that retrieve on-disk bin and bucket structures of a persistent reply cache file from the storage device into the memory;
   program instructions that add each on-disk bin structure to an initially empty set of in-core bin structures in the memory;
   program instructions that retrieve an array of on-disk bucket structures from the storage device for each in-core bin structure;
   program instructions that add each on-disk bucket structure of the array to an initially empty set of in-core bucket structures for the in-core bin structure; and
   program instructions that process enhanced non-volatile log(NVLOG) records stored in an NVLOG of the storage system using the in-core and on-disk structures.

17. The non-transitory computer readable medium of claim 16, wherein the program instructions that process further comprise:
   program instructions that process an operation associated with each enhanced NVLOG record; and
   program instructions that perform an update of both the in-core and on-disk structures that correspond to each enhanced NVLOG record for the operation.

18. The non-transitory computer readable medium of claim 16, wherein the program instructions that add each on-disk bin structure to an initially empty set of in-core bin structures in the memory further comprise:
   program instructions that create the in-core bin structure in the memory that corresponds to each appropriate on-disk bin structure; and
   program instructions that insert the in-core bin structure onto a circular list in the memory based on a hash of a bin label of the bin structure.

19. The non-transitory computer readable medium of claim 16, wherein the program instructions that add each on-disk bucket structure of the array to an initially empty set of in-core bucket structures for the in-core bin structure further comprise:
   program instructions that create an in-core bucket structure corresponding to each on-disk bucket structure;
   program instructions that reference each in-core bucket structure to its corresponding in-core bin structure; and
   program instructions that insert each in-core bucket structure onto an appropriate hash chain based on a hash of a bucket tag of the bucket structure.

20. The non-transitory computer readable medium of claim 16, further comprising:
   program instructions that insert the in-core bucket structure onto a least recently used (LRU) list at a proper location based on a first timestamp from the corresponding on-disk bucket structure; and
   program instructions that adjust a second timestamp of the in-core bucket structure to reflect the first timestamp of the on-disk bucket structure.

* * * * *

UNITED STATES PATENT AND TRADEMARK OFFICE
CERTIFICATE OF CORRECTION

PATENT NO. : 8,161,236 B1
APPLICATION NO. : 12/148930
DATED : April 17, 2012
INVENTOR(S) : David B. Noveck et al.

Page 1 of 1

It is certified that error appears in the above-identified patent and that said Letters Patent is hereby corrected as shown below:

Col. 2, line 44 should read: "reply cache are consistent with ~~corn responding~~corresponding on-disk data"

Col. 5, line 41 should read: "However, as illustratively described herein, the ~~in formation~~information"

Col. 15, line 11 should read: "filename B, (ii) the ~~Mode~~inode number of file B, (iii) the rename"

Signed and Sealed this
Third Day of July, 2012

David J. Kappos
*Director of the United States Patent and Trademark Office*